(12) United States Patent
Kobayashi et al.

(10) Patent No.: US 8,347,726 B2
(45) Date of Patent: Jan. 8, 2013

(54) FREE-STANDING NANOWIRE SENSOR AND METHODS FOR FORMING AND USING THE SAME

(75) Inventors: Nobuhiko P. Kobayashi, Palo Alto, CA (US); Shih-Yuan Wang, Palo Alto, CA (US); Alexandre M. Bratkovski, Palo Alto, CA (US); R. Stanley Williams, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 869 days.

(21) Appl. No.: 11/739,853

(22) Filed: Apr. 25, 2007

(65) Prior Publication Data

US 2008/0264185 A1    Oct. 30, 2008

(51) Int. Cl.
*G01B 7/00* (2006.01)
*G01L 1/04* (2006.01)

(52) U.S. Cl. ............... 73/777; 257/E23.165; 977/956

(58) Field of Classification Search ............... 73/777, 73/862.637; 257/24, E23.165
See application file for complete search history.

(56) References Cited

U.S. PATENT DOCUMENTS

| | | | | |
|---|---|---|---|---|
| 3,696,998 A * | 10/1972 | Bhaskaran Nair | | 238/349 |
| 4,362,375 A * | 12/1982 | Takara et al. | | 396/618 |
| 6,286,226 B1 | 9/2001 | Jin | | |
| 6,756,795 B2 * | 6/2004 | Hunt et al. | | 324/701 |
| 6,882,051 B2 * | 4/2005 | Majumdar et al. | | 257/746 |
| 7,112,816 B2 * | 9/2006 | Schlaf et al. | | 257/24 |
| 7,129,467 B2 * | 10/2006 | Wincheski et al. | | 250/214.1 |
| 7,158,219 B2 * | 1/2007 | Li et al. | | 356/36 |
| 7,163,659 B2 | 1/2007 | Stasiak et al. | | |
| 7,388,200 B2 * | 6/2008 | Stewart et al. | | 250/306 |
| 7,426,025 B2 * | 9/2008 | Wang | | 356/301 |
| 2002/0129761 A1 * | 9/2002 | Takami | | 117/73 |
| 2003/0124717 A1 * | 7/2003 | Awano et al. | | 435/287.2 |
| 2004/0106203 A1 * | 6/2004 | Stasiak et al. | | 436/49 |
| 2004/0244677 A1 * | 12/2004 | Takami | | 117/104 |
| 2005/0161662 A1 * | 7/2005 | Majumdar et al. | | 257/18 |
| 2005/0224360 A1 * | 10/2005 | Varghese et al. | | 205/171 |
| 2006/0038990 A1 * | 2/2006 | Habib et al. | | 356/301 |
| 2006/0146323 A1 * | 7/2006 | Bratkovski et al. | | 356/301 |
| 2006/0200044 A1 | 9/2006 | Freeman et al. | | |
| 2006/0240588 A1 * | 10/2006 | Conley et al. | | 438/49 |
| 2007/0134866 A1 * | 6/2007 | Huang et al. | | 438/199 |
| 2007/0170071 A1 * | 7/2007 | Suh et al. | | 205/687 |
| 2008/0067618 A1 * | 3/2008 | Wang et al. | | 257/415 |

(Continued)

FOREIGN PATENT DOCUMENTS

EP    1426756 A1 *    6/2004

(Continued)

OTHER PUBLICATIONS

Jin Fan, Hong et al. "Arrays of verticaly aligned and hexagonnaly arranged ZnO nanowires: a new template-directed approach." Nanotechnology 16 (Apr. 2005) 913-917.*

(Continued)

*Primary Examiner* — Lisa Caputo
*Assistant Examiner* — Punam Roy (57) ABSTRACT

A sensing device includes a nanowire configured to deform upon exposure to a force, and a transducer for converting the deformation into a measurement. The nanowire has two opposed ends; and the transducer is operatively connected to one of the two opposed ends of the nanowire. The other of the two opposed ends of the nanowire is freestanding.

26 Claims, 4 Drawing Sheets

U.S. PATENT DOCUMENTS

2010/0220385 A1 * 9/2010 Crowley ............ 359/328

FOREIGN PATENT DOCUMENTS

| JP | 2004085392 A | * | 3/2004 |
| JP | 2005172506 A | * | 6/2005 |
| JP | 2005339843 A | * | 12/2005 |
| JP | 2006308559 A | * | 11/2006 |
| JP | 2006342040 A | * | 12/2006 |
| WO | WO 02/079514 | * | 10/2002 |
| WO | WO 2007033189 A1 | * | 3/2007 |
| WO | WO 2008013341 A1 | * | 1/2008 |

OTHER PUBLICATIONS

Parthangal, Prahalad et al. "A universal approach to electrically connecting nanowire arrays using nanoparticles—application to a novel gas sensor architecture." Nanotechnology 17 (Jul. 2006) 3786-3790.*

C.S. Huang, B.R. Huang, Y.H. Jang, M.S. Tsai, C.Y. Yeh. "Three-terminal CNTs gas sensor for N2 detection", Diamond and Related Materials, vol. 14, Issues 11-12, Proceedings of the 10th International Conference on New Diamond Science and Technology (ICNDST-10)—ICNDST-10 Special Issue, Nov.-Dec. 2005, pp. 1872-1875.*

W. J. Kim, S. M. Carr, and M. N. Wybourne. "Direct contact buckling of electrochemically grown gold nanowires." Applied Physics Letters 87. pp. 173112-1 to 173112-3. (2005).*

B. A. Evans, A. R. Shields, R. Llyod Carroll, S. Washburn, M. R. Falvo, and R. Superfine. "Magnetically Actuated Nanorod Arrays as Biomimetic Cilia." Nano Lett., Apr. 10, 2007.*

X. Wang, J. Zhou, J. Song, L. Liu, N. Xu, and Z. L. Wang. "Piezoelectric Field Effect Transistor and Nanoforce Sensor Based on a Single ZnO Nanowire." Nano Lett., vol. 6, pp. 2768-2772. Nov. 22, 2006.*

X. D. Bai, P. X. Gao, and Z. L. Wang. "Dual-mode mechanical resonance of individual ZnO nanobelts." Applied Physics Letters. vol. 82, No. 26, Jun. 30, 2003.*

K.B. K. Teo, M. Chhowalla, G. A. J. Amaratunga, W. I. Milne, "Field emission from dense, sparse, and patterned arrays of carbon nanofibers," Appl. Phys. Lett. vol. 80, No. 11, Mar. 18, 2002, pp. 2011-2013.*

Y. Huang, X. Bai, and Y. Zhang, "In situ mechanical properties of individual ZnO nanowires and the mass measurement of nanoparticles," J. Phys. Condens. Matter, 18, (2006) L179-L184.*

U.S. Appl. No. 11/583,262, filed Oct. 19, 2006, Stewart et al.

* cited by examiner

US 8,347,726 B2
FREE-STANDING NANOWIRE SENSOR AND METHODS FOR FORMING AND USING THE SAME

BACKGROUND

The present disclosure relates generally to sensing devices, and to methods for forming and using the sensing devices.

Since the inception of semiconductor technology, a consistent trend has been toward the development of smaller device dimensions and higher device densities. As a result, nanotechnology has seen explosive growth and generated considerable interest. Nanotechnology is centered on the fabrication and application of nano-scale structures, or structures having dimensions that are often 5 to 100 times smaller than conventional semiconductor structures. Nanowires are included in the category of nano-scale structures.

Nanowires are wire-like structures having at least one linear dimension ranging from about 3 nm to about 200 nm. Nanowires are suitable for use in a variety of applications, including functioning as conventional wires for interconnection applications or as semiconductor devices. Nanowires are also the building blocks of many potential nano-scale devices, such as nano-scale field effect transistors (FETs), p-n diodes, light emitting diodes (LEDs) and nanowire-based sensors, to name a few. Nanowire based sensors often include multiple probes or electrodes operatively connected to nanowires, resulting in sensors that may be categorized as two or three terminal devices.

BRIEF DESCRIPTION OF THE DRAWINGS

Features and advantages of embodiments of the present disclosure will become apparent by reference to the following detailed description and drawings, in which like reference numerals correspond to similar, though not necessarily identical, components. For the sake of brevity, reference numerals or features having a previously described function may not necessarily be described in connection with other drawings in which they appear.

DETAILED DESCRIPTION

Embodiments of the sensing device disclosed herein advantageously include one or more nanowires, each having one opposed end operatively connected to a transducer, and another opposed end that is freestanding. As used herein, the term "freestanding" means not permanently attached, or unaffixed to a substrate or other structure. Such devices utilize the relatively unique geometry of the nanowire to form sensors that are capable of detecting reversible deformations of the nanowires (e.g., temporal deformations).

Figure 1:
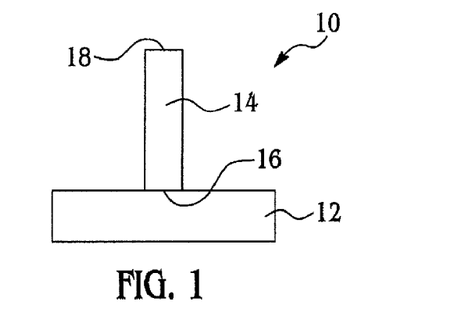
FIG. 1 is a semi-schematic diagram of an embodiment of the sensing device.

FIG. 1 depicts one embodiment of the sensing device 10. As previously mentioned, the device 10 includes the transducer 12 and the deformation sensing nanowire 14. The transducer 12 may be formed of any suitable material that is capable of transducing deformations experienced by the nanowire 14 into a measurable signal (described further hereinbelow). Non-limiting examples of suitable transducing materials include piezoelectric materials, metal materials, semiconductor materials, and/or combinations thereof. Examples of suitable piezoelectric materials include, but are not limited to $BaTiO_3$, $PbZrTiO_3$, polyvinylidene difluoride (PVDF), and/or the like, and/or combinations thereof. Examples of suitable metal materials include, but are not limited to aluminum, platinum, chromium, and/or other like metals, and/or alloys thereof (e.g., silicides), and/or combinations thereof. Examples of suitable semiconductor materials include, but are not limited to group IV materials (e.g., Si, Ge, etc.), group III-V materials (e.g., GaAs, InP, etc.), group II-VI materials (e.g., ZnSe, ZnS, etc.), transition metal oxides (e.g., $TiO_2$, etc.), and/or the like, and/or combinations thereof.

In one embodiment, the transducer 12 is part of another device. As non-limiting examples, the transducer 12 may be a part (e.g., gate, channel, etc.) of conventional three-terminal devices (e.g., transistors), or may be one terminal of a two-terminal device (e.g., conductor, diode, etc.), or combinations thereof.

Figure 9:
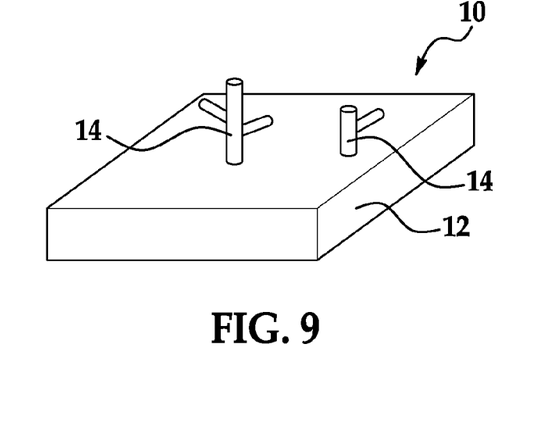
FIG. 9 is a schematic perspective diagram of an embodiment of the sensing device including branched nanowires.

As shown in FIG. 1, one of the opposed ends 16, 18 of the nanowire 14 is operatively connected to the transducer 12, and the other of the opposed ends 18, 16 is freestanding. It is to be understood that either of the opposed ends 16, 18 may be operatively connected to the transducer 12, as long as the other of the opposed ends 18, 16 remains freestanding. The nanowire 14 may be a straight nanowire (see, for example, FIG. 1), a branched nanowire (see FIG. 9), a decorated nanowire (see FIG. 10 e.g., having metal particles established thereon; non-limiting examples of which are further described in U.S. patent application Ser. No. 11/537,589, filed on Sep. 29, 2006, which is incorporated herein by reference in its entirety), a curved nanowire (see FIG. 11), and/or combinations thereof. Furthermore, while one nanowire 14 is shown in the device 10 of FIG. 1, it is to be understood that the device 10 may include a plurality of nanowires 14.

Figure 2:
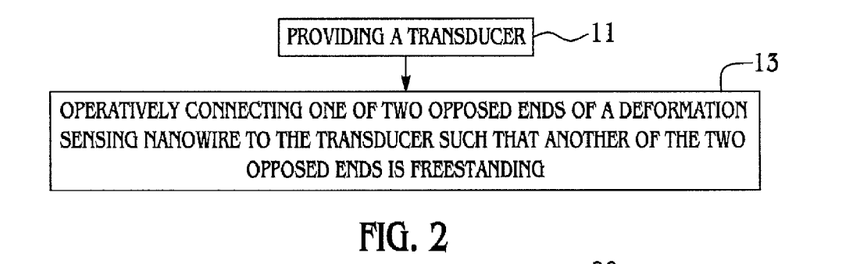
FIG. 2 is a flow diagram depicting an embodiment of a method for forming an embodiment of the sensing device.

FIG. 2 depicts an embodiment of forming such a sensing device 10. Very generally, such a method includes providing the transducer 12, as shown at reference numeral 11; and operatively connecting one of the two opposed ends 16, 18 of the deformation sensing nanowire 14 to the transducer 12 such that the other of the two opposed ends 18, 16 is freestanding, as shown at reference numeral 13. Various embodiments of the method and the sensing device 10 are described in further detail in reference to the other figures.

Figure 3A:
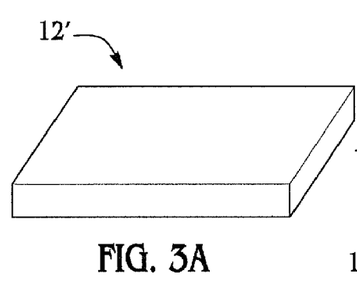
FIGS. 3A through 3D together depict a semi-schematic flow diagram of an embodiment of the method for forming an embodiment of the sensing device.

Referring now to FIGS. 3A through 3D together, one embodiment of the method for forming the sensing device 10 is depicted. As shown in FIG. 3A, this embodiment of the method includes a substrate 12' that will ultimately form the transducer 12. The substrate 12' may have any desirable shape, size, and/or configuration. The substrate 12' may also be formed of any suitable material that is capable of transducing the sensed deformation, such as those previously described for transducer 12.

Figure 3B:
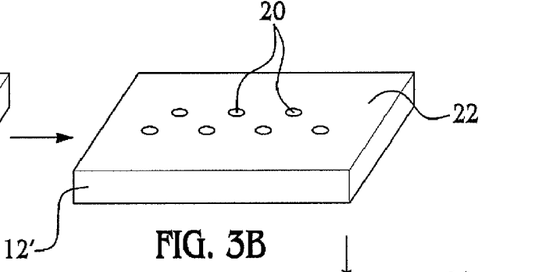

FIG. 3B depicts catalyst nanoparticles 20 established on the substrate surface 22. In one embodiment, the catalyst nanoparticles 20 are formed by depositing material(s) on the substrate 12' that form the catalyst nanoparticles 20 when exposed to heat (e.g., via annealing). In another embodiment, pre-formed catalyst nanoparticles 20 are deposited on the substrate 12'. In either embodiment, suitable deposition processes include, but are not limited to physical deposition processes, solution deposition processes, chemical deposition processes, electrochemical deposition processes, and/or combinations thereof. Non-limiting examples of suitable materials for the catalyst nanoparticles 20 include gold, titanium, platinum, nickel, and/or the like, and/or combinations thereof.

Figure 3C:
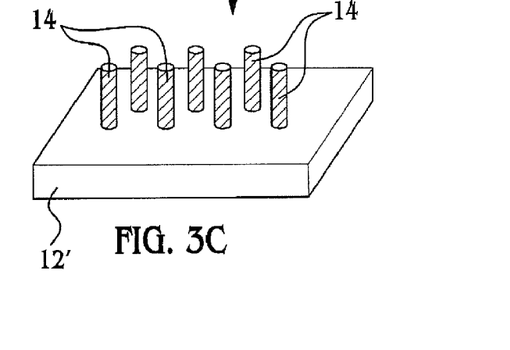

Once the catalyst nanoparticles 20 are established on the substrate surface 22, they are exposed to a precursor gas that initiates growth of the nanowires 14. Non-limiting examples of suitable growth processes include liquid phase deposition, chemical vapor deposition, physical vapor deposition, nanoimprinting, nanotemplating, sol-gel, electroplating, and/or electrochemical deposition. Grown nanowires 14 are shown in FIG. 3C. Non-limiting examples of the types of nanowire(s) 14 that may be formed include silicon nanowires, germanium nanowires, other group IV semiconductor nanowires, group III-V nanowires, group II-V nanowires, compound semiconductor nanowires (including lattice mismatched nanowires (e.g., indium phosphide nanowires grown on silicon with a lattice mis-match of about 8%)), metal oxide nanowires (e.g., $TiO_2$), magnetic nanowires, or the like, or combinations thereof. The nanowire(s) 14 may also be formed of p-type or n-type semi-conductor materials. In an embodiment, the nanowire 14 may have multiple segments, at least two of which are formed of different materials. As a non-limiting example, the nanowire 14 may include a p-type segment and an n-type segment adjacent each other.

Figure 3D:
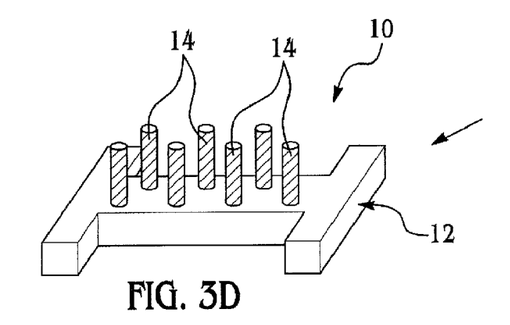

FIG. 3D depicts the fabrication of the transducer 12 from the substrate 12'. This may be accomplished via various lithography techniques. Non-limiting examples of such techniques include conventional optical lithography, energetic beam (e.g., electron, ion, etc.) lithography, x-ray lithography, nanoimprinting, and/or the like, and/or combinations thereof.

In another embodiment, the catalyst nanoparticles 20 are established, and the nanowires 14 are grown on a pre-fabricated transducer 12. As such, this embodiment of the method does not include the final step of fabricating the transducer 12 from the substrate 12', as shown in FIG. 3D.

It is to be understood that the nanowires 14 may be oriented in any suitable direction. As depicted in FIGS. 3C and 3D, the nanowires 14 may be uniformly oriented. In other embodiments, the nanowires 14 may be randomly oriented with respect to the transducer 12 and/or with respect to other nanowires 14.

Figure 4A:
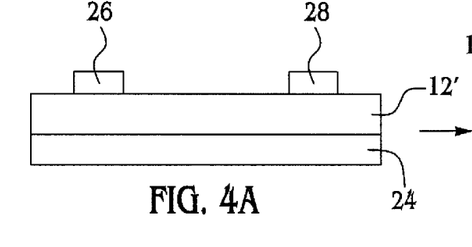
FIGS. 4A through 4D together depict a semi-schematic flow diagram of an embodiment of the method for forming another embodiment of the sensing device.

FIGS. 4A through 4D depict another embodiment of the method for forming another embodiment of the sensing device 10'. As shown in FIG. 4A, this embodiment of the method includes a substrate 12' established on an insulating layer 24. The insulating layer 24 may be any suitable material, non-limiting examples of which include silicon dioxide ($SiO_2$) thermally formed on silicon wafers. Without being bound to any theory, it is believed that the insulating layer 24 enables the electrical isolation of one sensing device 10, 10' from another sensing device 10, 10' in an array of sensing devices 10, 10'.

Electrodes 26, 28 are formed on the substrate 12'. It is to be understood that the electrodes 26, 28 may be formed from the substrate 12' material or from a material (not shown) established on the substrate 12', or may be pre-fabricated and operatively connected to the substrate 12'. In one embodiment, the electrodes 26, 28 are formed on a sacrificial substrate, and are transferred from the sacrificial substrate to the substrate 12'. In this embodiment, the sacrificial substrate (having the electrodes 26, 28 attached thereto) and the substrate 12' are oriented such that each of the electrodes 26, 28 contacts the substrate 12'. The electrodes 26, 28 may be bonded to the substrate 12' at the point of contact. As a non-limiting example, bonding may be accomplished by contacting a surface of the electrode 26, 28 with a surface of the substrate 12' in a controlled environment (e.g., in a specific gas atmosphere or under vacuum), and applying a predetermined amount of mechanical pressure at an elevated temperature. The sacrificial substrate may then be removed, leaving the electrodes 26, 28 attached to the substrate 12'. The sacrificial substrate may be removed via a selective etching process.

Figure 4B:
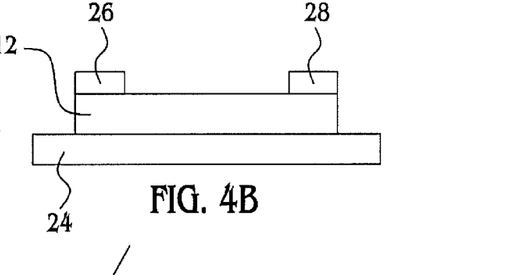

FIG. 4B depicts the formation of the transducer 12 from the substrate 12'. In this embodiment, the transducer 12 acts as a conducting path between the electrodes 26, 28. Patterning and etching may be used to form the transducer 12 from the substrate 12'.

Figure 4C:
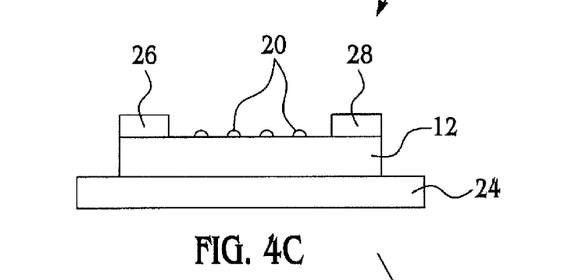
Figure 4D:
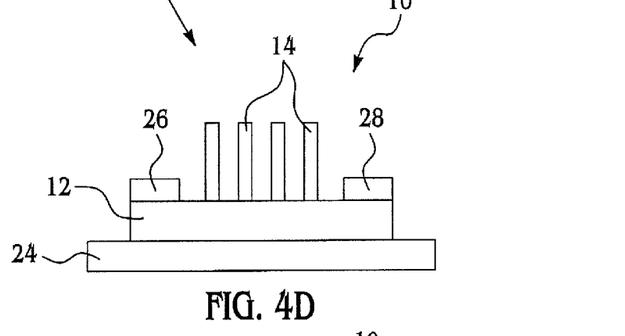

Respectively, FIGS. 4C and 4D depict the catalyst nanoparticles 20 established on the transducer 12, and the subsequent formation of the nanowires 14. It is to be understood that any suitable method (such as those previously described) for establishing the catalyst nanoparticles 20 and growing the nanowires 14 may be used in this embodiment.

As previously stated, the nanowires 14 may be oriented in any suitable direction, including the substantially uniform orientation shown in FIG. 4D, a random orientation, or combinations thereof.

The embodiments of the sensing device 10, 10' disclosed herein may be used to sense various external forces. Non-limiting examples of such external forces include mechanical forces, electromagnetic forces, fluid flow forces, electrostatic forces, magnetic forces, gravitational forces, inter-atomic forces, molecular forces, and/or combinations thereof.

Exposure to the external force may be accomplished for any suitable time period, which may depend, at least in part, on the type of force being applied, the type of measurements being made, or combinations thereof. In some embodiments, exposure is substantially continuous (e.g., exposure to gravitational forces). In other embodiments, exposure occurs at regular or random intervals. In still other embodiments, exposure occurs sporadically.

When one or more of these external forces contact the nanowire 14, deformation of the nanowire 14 results. As used herein, the term "deformation" includes movement or deflection of the freestanding end 18, 16 of the nanowire 14, movement or deflection of any of the nanowire 14 not affixed to a surface, or an indentation of all or a portion of the surface of the nanowire 14. Generally, the deformation is temporal, and the nanowire 14 will be deformed again or resume its original shape and/or orientation when the external force is changed or removed.

Such deformations (e.g., time-dependent deformations) of the nanowire 14 are elastically transmitted to the transducer 12 operatively connected thereto. In response, the transducer 12 converts the sensed deformation into a signal that can be measured. The transducer 12 may convert the sensed deformation into electrical transport signals (e.g., conductance, resistance), heat transport signals, optical signals (e.g., reflection, transmission, absorption), frequency shift (e.g., in optical emissions) signals, mechanical signals, and/or combinations thereof.

FIGS. 5A and 5B, 6A and 6B, and 7A and 7B each depict an embodiment of the sensor 10, 10' before and after exposure to an external force. Each of the respective embodiments illustrates an example of a deformation that results upon exposure to the external force.

Figure 5A:
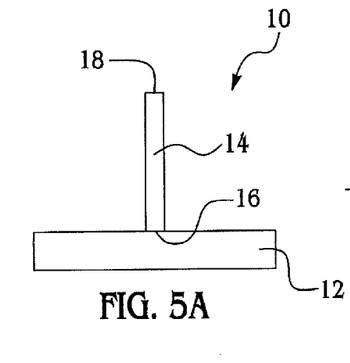
FIGS. 5A and 5B together depict an embodiment of the method of using an embodiment of the sensing device.
Figure 5B:
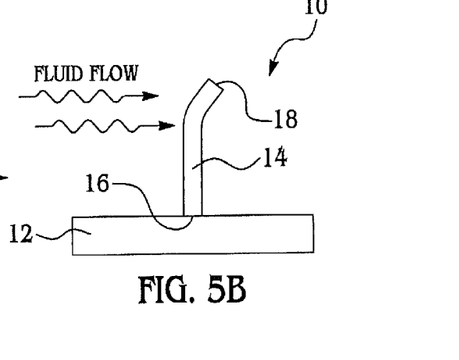

Specifically referring now to FIGS. 5A and 5B, the embodiment of the sensing device 10 (shown in FIG. 1) is shown before (5A) and after (5B) exposure to fluid flow forces. The fluid flow may be gas flow, liquid flow, or combinations thereof. As shown in FIG. 5B, the fluid flow forces cause the nanowire 14 to deform (e.g., deflect). This movement causes a change in a property of the nanowire 14 that is recognized by the transducer 12. The transducer 12 then converts this change into a measurable signal.

In an embodiment, the transducer 12 may be part of a device configured to measure resistance or conductance, and the nanowire 14 deflection modulates the conductance between two electrodes. In a non-limiting example, the nanowires 14 are attached to a transducer 12 that is part of a gate of a transistor, and the conductance is modulated between the source and drain electrodes.

Figure 6A:
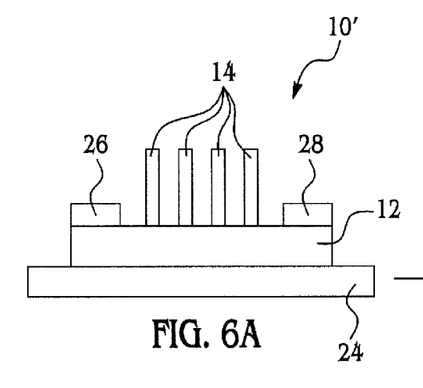
FIGS. 6A and 6B together depict another embodiment of the method of using an embodiment of the sensing device.
Figure 6B:
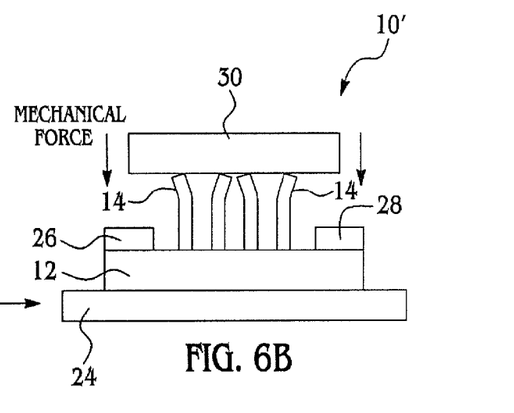

FIGS. 6A and 6B depict the embodiment of the sensor 10' shown in FIG. 4D before (6A) and after (6B) exposure to a mechanical force. It is to be understood that the mechanical force may be applied by contacting the nanowires 14 with an object 30 (e.g., a weight). It is to be understood that the object 30 temporarily contacts the nanowires 14 such that the nanowires 14 are still freestanding. As shown in FIG. 6B, upon application of the mechanical force, the nanowires 14 each bend or deform. This movement causes a change in a property of each of the nanowires 14 that is recognized by the transducer 12. The transducer 12 then converts these changes into measurable signals.

Figure 7A:
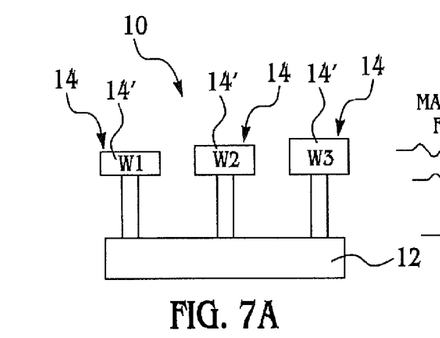
FIGS. 7A and 7B together depict still another embodiment of the method of using an embodiment of the sensing device.
Figure 7B:
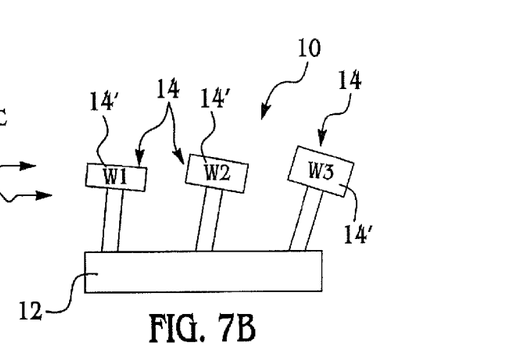

Referring now to FIGS. 7A and 7B, still another embodiment of the sensor 10, including a plurality of branched nanowires 14, 14', is shown before (7A) and after (7B) exposure to external forces, for example magnetic forces. In this embodiment, the masses W1, W2, W3 of the respective branched portions 14' of the nanowires 14 (or of the nanowire 14 itself when no branches 14' are present) are designed to have variations (e.g., one branch 14', W3 is heavier than another branch 14', W2). These mass variations provide different overall spring constants for each of the nanowires 14, 14' when they mechanically deform. In other words, forces exerted on the nanowires 14, 14' having a particular mass W1, W2, W3 result in different levels of deformation. As such, a sensing device 10, 10' having an array of nanowires 14, 14' with different masses W1, W2, W3 is capable of detecting a wide range of forces (i.e., a dynamic range of detection may be broadened).

Furthermore, a sensing device 10, 10' may include a series of nanowires 14, 14' with different masses W1 ... Wn, where each mass corresponds with a particular frequency. Such a device is capable of detecting a wide range of frequencies over a frequency spectrum of applied force. Each nanowire 14 having a particular mass W1, W2, W3 ... Wn has its own mechanical resonance at a specific frequency. By measuring the amplitudes of response, the spectrum of applied force may be determined (e.g., if there are particular frequencies in the temporal behavior of applied force). This may be useful for feedback control of microfluidic systems with systolic pumps, or blood flow in living organisms, etc.

As shown in FIG. 7B, upon exposure to a predetermined magnetic field, the nanowires 14 respond and deform differently, depending, at least in part, on the mass W1, W2, W3 of the branched portion 14' attached to their respective ends. This movement causes a change in a property of the nanowires 14 configured to detect the deformation associated with the predetermined magnetic force, which is recognized by the transducer 12. The transducer 12 then converts the change into measurable signals.

As previously indicated, unbranched nanowires 14 may also be designed with different masses, whereby upon exposure to particular force(s), each nanowire 14 responds differently.

Figure 8A:
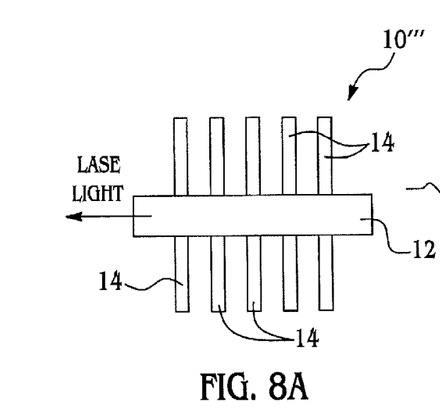
FIGS. 8A and 8B together depict still another embodiment of the method of using an embodiment of the sensing device.
Figure 8B:
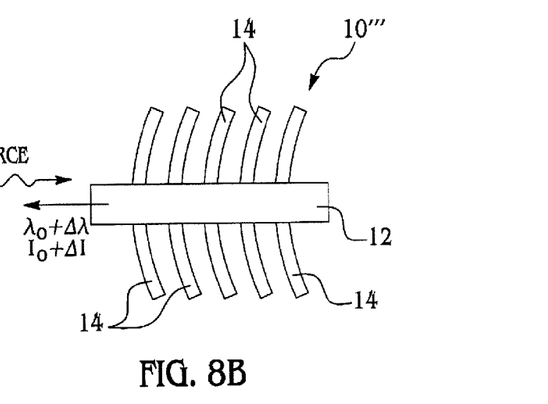

FIGS. 8A and 8B depict still another embodiment of the sensor 10''', which includes a vertical cavity surface emitting laser as the transducer 12. As shown in FIG. 8A, the vertical cavity surface emitting laser transducer 12 emits a lase light having a wavelength $\lambda$ and an intensity I. $I_o$ and $\lambda_o$ represent the intensity and wavelength, respectively, of the laser output without perturbation exerted on the nanowires 14. When exposed to an external force, nanowire 14 deformation takes place, and the signal output from the vertical cavity surface emitting laser (transducer 12) is indicative of a shift in lasing frequency or a shift in lasing output power ($\lambda_o + \Delta\lambda$, $I_o + \Delta I$).

While several embodiments have been described in detail, it will be apparent to those skilled in the art that the disclosed embodiments may be modified. Therefore, the foregoing description is to be considered exemplary rather than limiting.

What is claimed is:

1. A sensing device, comprising:
   a freestanding nanowire configured to reversibly deform upon exposure to a force, the freestanding nanowire having two opposed ends; and
   a transducer configured to convert mechanical stress, exerted thereon by the freestanding nanowire when it is reversibly deformed, into a measurement, the transducer operatively connected to one of the two opposed ends of the nanowire, whereby an other of the two opposed ends is freestanding, and the freestanding end of the nanowire is configured to undergo the reversible deformation without making contact with any other element of the sensing device.

2. The sensing device as defined in claim 1 wherein the transducer is selected from a piezoelectric material, a metal material, a semiconductor material, and combinations thereof.

3. The sensing device as defined in claim 1 wherein the transducer is capable of converting the mechanical stress resulting from the deformation into electrical transport signals, heat transport signals, optical signals, frequency shift signals, or mechanical signals.

4. The sensing device as defined in claim 1 wherein the deformation results from mechanical forces, electromagnetic forces, fluid flow, electrostatic forces, magnetic forces, gravitational forces, inter-atomic forces, or molecular forces.

5. The sensing device as defined in claim 4 wherein the nanowire is capable of deforming when exposed to external forces, and wherein the nanowire has a predetermined mass that responds to a predetermined external force.

6. The sensing device as defined in claim 1 wherein the transducer is selected from one part of a three-terminal device, one terminal of a two-terminal device, and combinations thereof.

7. The sensing device as defined in claim 1, further comprising a plurality of freestanding nanowires operatively connected to the transducer, wherein each of the plurality of freestanding nanowires is configured to reversibly deform, without making contact with an other of the plurality of freestanding nanowires, upon exposure to the force, wherein each of the plurality of freestanding nanowires has two opposed ends, and wherein one of the two opposed ends is connected to the transducer, and an other of the two opposed ends is freestanding.

8. The sensing device as defined in claim 1 wherein the nanowire is selected from straight nanowires, branched nanowires, decorated nanowires, curved nanowires, and combinations thereof.

9. The sensing device as defined in claim 1 wherein the reversible deformation experienced by the freestanding nanowire is temporal.

10. The sensing device as defined in claim 1 wherein the mechanical stress exerted by the freestanding nanowire is elastically transmitted to the transducer.

11. The sensing device as defined in claim 1 wherein the device includes a single freestanding nanowire.

12. The sensing device as defined in claim 1 wherein the transducer is a piezoelectric material selected from $BaTiO_3$, $PbZrTiO_3$, polyvinylidene difluoride (PVDF), and combinations thereof.

13. The sensing device as defined in claim 1 wherein the freestanding nanowire is selected from group IV semiconductor nanowires, group III-V semiconductor nanowires, group II-V semiconductor nanowires, compound semiconductor nanowires, and metal oxide nanowires.

14. A sensing method, comprising:
exposing a freestanding nanowire that has one of two opposed ends operatively connected to a transducer to an external force, thereby causing a deformation in the freestanding nanowire, the deformation causing mechanical stress to be exerted from the freestanding nanowire onto the transducer;
recognizing the mechanical stress at the transducer; and
transducing, via the transducer operatively connected to the one end of the freestanding nanowire, the mechanical stress to a signal.

15. The sensing method as defined in claim 14 wherein the deformation is temporal and reversible.

16. The sensing method as defined in claim 14 wherein the signal is selected from electrical transport signals, heat transport signals, optical signals, frequency shift signals, and mechanical signals.

17. The sensing method as defined in claim 16, further comprising measuring the signal.

18. The sensing method as defined in claim 14 wherein the external force is selected from mechanical forces, electromagnetic forces, fluid flow, electrostatic forces, magnetic forces, gravitational forces, inter-atomic forces, and molecular forces.

19. The sensing method as defined in claim 14 wherein the transducer is a vertical cavity surface emitting laser, and wherein the signal is indicative of a shift in lasing frequency or a shift in lasing output power.

20. The method as defined in claim 14, further comprising elastically transmitting the mechanical stress exerted by the freestanding nanowire to the transducer.

21. A method for forming a sensing device, the method comprising:
providing a transducer configured to recognize a force experienced by a freestanding nanowire as mechanical stress at a point where one of two opposed ends of the freestanding nanowire is operatively connected to the transducer and to convert the mechanical stress into a measurement; and
operatively connecting the one of the two opposed ends of the freestanding nanowire to the transducer such that an other of the two opposed ends is freestanding and such that upon experiencing the force, the freestanding end of the nanowire avoids contact with any other device element.

22. The method as defined in claim 21 wherein providing the transducer is accomplished by:
positioning two electrodes a spaced distance apart from each other on a substrate; and
patterning a conducting path from a conductive or semi-conductive layer of the substrate.

23. The method as defined in claim 22 wherein the substrate includes the conductive or semi-conductive layer on an insulating layer.

24. The method as defined in claim 22 wherein operatively connecting is accomplished by growing the nanowire from a catalyst established on the conducting path.

25. The method as defined in claim 21 wherein operatively connecting is accomplished by:
establishing a catalyst nanoparticle on the transducer; and
growing the nanowire from the catalyst nanoparticle.

26. A sensing device, comprising:
a freestanding nanowire having a freestanding end and an other end opposed thereto, the freestanding nanowire being configured to deform, without the freestanding end making contact with any other element of the sensing device, upon exposure to a force; and
a piezoelectric transducer having the other end of the nanowire positioned on a surface thereof such that it is operatively connected to the freestanding nanowire, the piezoelectric transducer configured to convert mechanical stress, exerted thereon by the freestanding nanowire in response to the deformation, into a measurement.

* * * * *

UNITED STATES PATENT AND TRADEMARK OFFICE
CERTIFICATE OF CORRECTION

| | | |
|---|---|---|
| PATENT NO. | : 8,347,726 B2 | Page 1 of 1 |
| APPLICATION NO. | : 11/739853 | |
| DATED | : January 8, 2013 | |
| INVENTOR(S) | : Nobuhiko P. Kobayashi et al. | |

Figure 10:
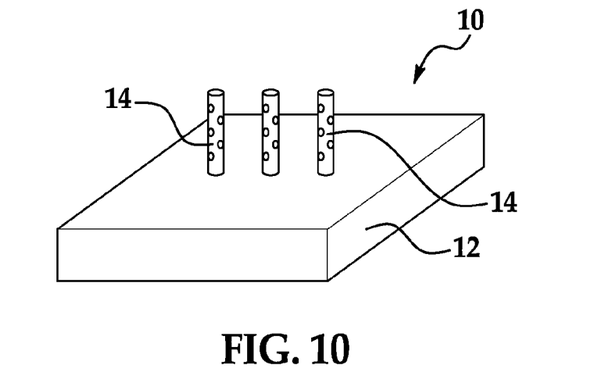
FIG. 10 is a schematic perspective diagram of an embodiment of the sensing device including decorated nanowires.
Figure 11:
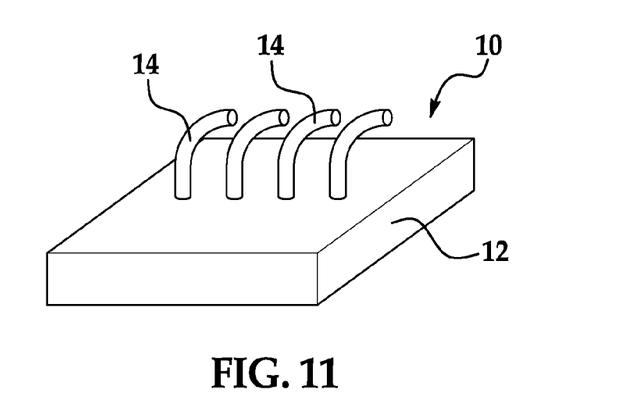
FIG. 11 is a schematic perspective diagram of an embodiment of the sensing device including curved nanowires.

It is certified that error appears in the above-identified patent and that said Letters Patent is hereby corrected as shown below:

In the Specifications:

In column 2, line 42, delete "FIG. 10" and insert -- FIG. 10, --, therefor.

In the Claims:

In column 8, line 3, in Claim 20, delete "method" and insert -- sensing method --, therefor.

Signed and Sealed this
Fourteenth Day of May, 2013

Teresa Stanek Rea
*Acting Director of the United States Patent and Trademark Office*